United States Patent Office 3,642,739
Patented Feb. 15, 1972

3,642,739
PROCESS FOR PRODUCTION OF HYDROXYL-CONTAINING COPOLYMERS
Johan van Gogh and Jan H. de Kruif, Amsterdam, Netherlands, assignors to Shell Oil Company, New York, N.Y.
No Drawing. Filed Oct. 9, 1969, Ser. No. 865,168
Claims priority, application Great Britain, Oct. 15, 1968, 48,867/68
Int. Cl. C08f 15/26
U.S. Cl. 260—86.3
7 Claims

ABSTRACT OF THE DISCLOSURE

Hydroxyl-containing copolymers which have low acid values and which when cured with conventional resins such as melamine-formaldehyde and urea-formaldehyde resins produce films which exhibit good mechanical and chemical properties, good gloss and whiteness retention as well as polishability, are prepared by copolymerizing, in an aqueous dispersion, (A) an olefinically unsaturated hydroxyl-containing ester having the general formula

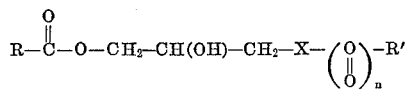

wherein R is an alpha, beta-ethylenically unsaturated group, R' is a group free of olefinic unsaturation, $n$ is 0 or 1, and X is O or S and (B) at least one other olefinically unsaturated monomer.

BACKGROUND OF THE INVENTION

Hydroxyl-containing copolymers and their preparation are known in the art; however, most of these copolymers do not have the desired physical properties for many applications, particularly polishability, i.e., the ability to be polished to a high gloss when prepared as films. Heretofore, car bodies and the like, have been spray coated with thermosetting acrylics in order to obtain such a high gloss. It has now been discovered that films which possess good flow properties, good mechanical and chemical properties, good gloss and whiteness retention, as well as the very desirable polishability, are obtained from special hydroxyl-containing copolymers having pendant hydroxy(iso)propoxycarbonyl groups attached to the copolymer backbone.

SUMMARY OF THE INVENTION

The invention relates to novel hydroxyl-containing copolymers and to a process for the production of such copolymers which, in addition, have pendant ester groups attached to a backbone which is derived from ethylenically unsaturated monomer units.

The copolymers according to the present invention are prepared by the addition copolymerization in aqueous dispersion of olefinically unsaturated monomers substantially free of carboxyl groups comprising:

(A) an olefinically unsaturated, hydroxy-containing ester having the formula

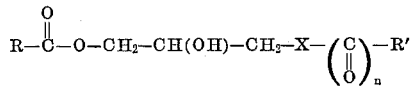

wherein R is an alpha, beta-olefinically unsaturated group, preferably containing up to about 16 carbon atoms and more preferably from about 2 to about 12 carbon atoms; R' is a group free of olefinic unsaturation, preferably saturated aliphatic or cycloaliphatic group (alkyl and cycloalkyl groups) containing up to about 20 carbon atoms such as methyl, ethyl, propyl, butyl, hexyl, nonyl, decyl, hexadecyl, cyclohexyl, cyclododecyl, etc., or an aromatic group (aryl and alkaryl groups) such as phenyl, naphthyl, tolyl, para-tert-butyl-phenyl, etc.; $n$ is zero (0) or 1; and X is oxygen when $n$ is 1 or is sulfur or oxygen when $n$ is 0; and (B) at least one other copolymerizable olefinically unsaturated compound (monomer).

DESCRIPTION OF THE PREFERRED EMBODIMENT

The present invention is particularly directed to special hydroxyl group-containing copolymers which are prepared by copolymerizing in aqueous dispersion (A) hydroxyl-containing esters prepared by reacting (1) a glycidyl ether or ester with (2) a carboxylic acid, alcohol, phenol, mercaptan or thiophenol with (B) at least one other non-carboxylic olefinically unsaturated monomer such as vinyl chloride.

The unsaturated monomers of type (A) and type (B) should be substantially free of carboxyl groups, although in practice, small amounts of carboxyl group-containing monomers may be present. These monomers are not harmful to the properties of the resulting copolymers, however, the amount of such monomers preferably should not exceed 1 percent m., particularly 0.5 percent m., based on the total amount of monomers (A) and (B). Due to the fact that the copolymerization according to the invention is carried out in an aqueous dispersion, any unsaturated acid or polymer thereof tends to remain dissolved or dispersed in the aqueous phase. Consequently, the resulting copolymer, which is insoluble in water, will be substantially free of carboxyl groups and have a low carboxyl content, which is of importance in improving chemical resistance and whiteness retention.

The hydroxy-containing ester (A) to be used as co-monomer may be prepared in various ways, some of which are already known from the art. Thus, said ester may be obtained by reacting a glycidyl ether or glycidyl ester with a carboxylic acid, alcohol, phenol, mercaptan or thiophenol. From the above formula it follows that the hydroxy-containing ester has alpha, beta-olefinically unsaturated bond present in the R group, which bond enables copolymerization with the other unsaturated monomer (B).

The acyl group

is derived from an alpha, beta-unsaturated carboxylic acid, e.g., acrylic, methacrylic, crotonic, cinnamic, maleic and fumaric acid. Preferred are the alpha, beta-unsaturated monocarboxylic acids, particularly acrylic and methacrylic acid.

The group

($n$ being 1) is an acyl group derived from a saturated monocarboxylic acid. Typical acids belonging to this group, include para-tert-butylbenzoic, butyric, caprylic, 2-ethyl-hexanoic, lauric, palmitic and stearic acid. Preferred saturated monocarboxylic acids are the tertiary acids, in particular those having the formula

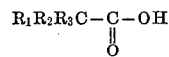

where $R_1$ is $CH_3$—, and $R_2$ and $R_3$ are alkyl groups of 1 to 16 carbon atoms each. Examples of such acids are pivalic acid, alpha,alpha-dimethyldecanoic acid, alpha, alpha-dimethylhexadecanoic acid and mixtures thereof. These tertiary acids (alpha-branched) may suitably be prepared by reaction of formic acid or carbon monoxide and water with olefins, in the presence of liquid acid catalysts, such as $H_2SO_4$, $H_3PO_4$, $BF_3$, HF and combinations of these and other catalysts known in this field of art. Suitable such alpha-branched saturated monocarboxylic acids may be represented by the general formula

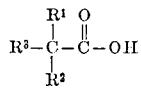

wherein $R^1$ and $R^2$ each represents the same or different alkyl radicals of normal, branched or cyclic structure and $R^3$ represents hydrogen or a hydrocarbyl radical. In the foregoing formula $R^1$ and $R^2$ each may be a methyl, ethyl, propyl, butyl, pentyl, octyl, decyl, etc. radical. Hydrocarbyl radicals represented by $R^3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha, alpha-dialkyl monocarboxylic acids having from 9 to about 22 carbon atoms in the molecule. A preferred group comprises the acids possessing from about 9 to 19 carbon atoms with those acids having from 9 to 11 being especially preferred. A suitable method for their preparation is disclosed in U.S. 3,047,662, U.S. 3,059,005 and U.S. 3,059,006. The saturated monocarboxylic acids preferably have at least 8 carbon atoms per molecule.

The group R'— ($n$ being 0) is a saturated aliphatic, aromatic or cycloaliphatic group derived from a monohydric alcohol, phenol, mercaptan or thiophenol R'XH in which R' and X have the meaning given above ($n$ being 0). Examples of these groups R' are methyl, ethyl, propyl, butyl, hexyl, nonyl, cyclohexyl, phenyl, benzyl, tolyl and para-tert-butyl-phenyl.

The hydroxy-containing esters (A) may be prepared by any one of the following reactions:

(1) The reaction between one or more of the above alpha,beta-unsaturated carboxylic acids and a glycidyl ether having the formula

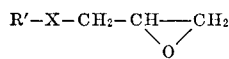

in which R' and X have the meaning identified above ($n$ being 0);

(2) The reaction between a glycidyl ester of the alpha, beta-unsaturated carboxylic acid, which ester is substantially free of carboxylic groups, and an alcohol, phenol, mercaptan or thiophenol having the formula R'—X—H in which R' and X have the meaning identified above ($n$ being 0);

(3) The reaction between a glycidyl ester of the alpha, beta-unsaturated carboxylic acid, which ester is substantially free of carboxyl groups, and a saturated monocarboxylic acid R'COOH in which

has the meaning identified above ($n$ being 1);

(4) The reaction between one or more of the alpha, beta-unsaturated carboxylic acids and a glycidyl ester having the formula

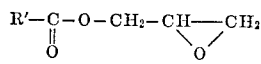

in which

has the meaning identified above ($n$ being 1). This latter reaction, mentioned in group (4), is the preferred one for the preparation of the hydroxy-containing ester (A).

Suitable glycidyl esters are the epoxy alkyl esters of alpha-branched, saturated, monocarboxylic acids having at least 4 carbon atoms, and preferably from about 9 to 19 carbon atoms in the molecule.

Preferably these acids are obtained by reacting olefins having at least 3 carbon atoms in the molecule with carbon monoxide and water. This reaction takes place under the influence of acid catalysts, for example, phosphoric acid, sulfuric acid, and complexes of phosphoric acid with boron fluoride. The reaction is more thoroughly described in U.S. 3,059,004, issued Oct. 16, 1962 of Marinus J. Waale and Johan M. Vox. As indicated in this patent the carboxyl group adds on at the double bond and even when the double bond is terminal, the addition is such that a strong tendency for tertiary groups to be formed by isomerization is noted. Branching at the double bond also provides a tertiary carboxyl group. Very attractive products are obtained when monoolefins having at least 8 and not more than 18 carbon atoms in the molecule are thus converted into monocarboxylic acids and subsequently via the epoxy alkyl esters of these acids into alkyd resins. Preferably, more than 10% of the monocarboxylic acids will be tertiary in the carboxyl group, and more preferably more than 85%.

The epoxy alkyl esters of the above monocarboxylic acids may be prepared in any of the known ways for obtaining epoxy esters from monocarboxylic acids. A preferred method for preparing such esters is set forth in a U.S. Pat. No. 3,178,454, issued Apr. 13, 1965, of Nantko Kloos and Jacques J. Drost.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the latter in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

Although among the epoxy alkyl esters the glycidyl esters are the most important for the present process, use may suitably be made of esters in which the molecule contains a different epoxy alkyl group, for example, 2,3-epoxybutyl, 3,4-epoxybutyl, 2,3-epoxybutyl, 2,3-epoxy-4-phenyloctyl, 1-ethyl-2,3-epoxyhexyl, 2,3-epoxy-4,5-diethyldodecyl and epoxycyclohexyl.

Very suitable epoxy esters may be represented by the empirical formula

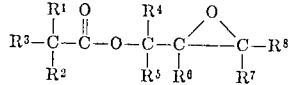

wherein $R^1$ and $R^2$ each represent the same or different alkyl radicals of normal branched or cyclic structure, and $R^3$, $R^4$, $R^5$, $R^6$, $R^7$ and $R^8$ each represent hydrogen or a hydrocarbyl radical. In the above formula R¹ and R² each may be methyl, ethyl, propyl, butyl, pentyl, octyl, decyl, etc., radicals. Hydrocarbyl radicals represented by R³, R⁴, R⁵, R⁶, R⁷ and R⁸ generally comprise the alkyl radicals of up to about 20 carbon atoms, but may be alkaryl, aralkyl, aryl radicals or the like.

Preferred epoxy alkyl esters, however, comprise the glycidyl esters of the general formula

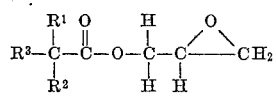

wherein R¹ and R² are each alkyl radicals such as methyl, ethyl, propyl, butyl, pentyl, nonyl, etc., and R³ is hydrogen or an alkyl radical and R¹, R² and R³ contain the sum total of from 2 to about 20 carbon atoms and preferably from about 7 to 17 carbon atoms.

A very preferred glycidyl ester is the glycidyl ester of a mixture of alpha-branched, saturated aliphatic monocarboxylic acid containing 9 to 11 carbon atoms and prepared by the process described in Example I of U.S. 3,268,462, issued Aug. 23, 1966. A very suitable such glycidyl ester is available commercially under the trade name of "Cardura" E and which is the glycidyl ester of a mixture of saturated monocarboxylic acids having a chain length of 9 to 11 carbon atoms, and largely consisting of tertiary acids (about 94%).

Another preferred glycidyl ester is derived from an alpha-branched, saturated monocarboxylic acid containing 10 carbon atoms which has been prepared preferably from propylene trimer.

The products of these reactions will mainly be the hydroxy-containing esters (A) having the formula given hereinabove. A minor part of the products, however, will have an isomeric structure having the formula

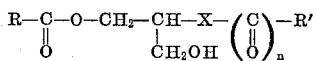

or

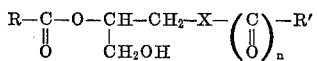

in which R, R', X and $n$ have the meaning identified above.

In reacting the glycidyl ester or ether with the acid, alcohol, phenol, mercaptan or thiophenol it is desirable to employ approximately stoichiometric amounts or a slight deficiency of the glycidyl compound, in particular, from 0.9 to 1.25 equivalents of the acid, alcohol, phenol, mercaptan on thiophenol per mole of glycidyl ester or ether. Thus 1.1 mole of acrylic acid may be reacted with 1 mole of "Cardura" E. When a dibasic unsaturated acid such as maleic is reacted with "Cardura" E or another glycidyl ester of a saturated monocarboxylic acid, or with a glycidyl ether of a monohydric alcohol, phenol, mercaptan or thiophenol, the ratio is preferably as nearly stoichiometrical as possible, e.g., 2 moles of "Cardura" E for 1 mole of maleic acid.

In view of the presence of reactive, olefinically unsaturated groups in the reaction mixture containing the glycidyl compound, it is desirable to maintain, utilize a suitable vinyl polymerization inhibitor in said mixture and also in the product monomer, i.e., the hydroxy-containing ester (A). Any one of the quinones, hydroquinones or partial ethers thereof is suitable for this purpose, e.g., hydroquinone, toluhydroquinone or the monomethyl ether of hydroquinone.

Various esterification/etherification catalysts may be used in the reaction of the glycidyl compound, such as potassium hydroxide, triethylamine and the phosphines, stibines and arsines such as triphenylphosphine, triphenylarsine and triphenylstibine. Triphenylphosphine or mixtures thereof with triphenylstibine have been found to be particularly suitable, as will be explained in the examples hereinafter.

Preferred phosphines include the organic phosphines, i.e., compounds of the formula

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phospheine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Other catalysts that may be used but are less preferred are the organic arsines, stibines and bismuthines. The organo-substituted arsines useful as catalysts are those of the formula As(R)₃ wherein at least one R is an organic radical and the other R's may be hydrogen or organic radicals. Particularly preferred arsines include the trihydrocarbyl arsines and the dihydrocarbyl arsines such as tricyclohexyl arsines, triphenyl arsine, trioctyl arsine, diphenyl butyl arsine, trixylyl arsine, tridecyl arsine, dicyclohexyl arsine, and tricyclohexenyl arsine. Particularly preferred arsines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and preferably not more than 9 carbon atoms.

The organo-substituted stibines are those of the formula Sb(R)₃ wherein at least one R is an organic radical and the other R's may be hydrogen or organic radicals. Preferred stibines include the trihydrocarbyl stibines and the dihydrocarbyl stibines, such as triphenyl stibine, tridodecyl stibine, tributyl stibine, dicyclohexyl stibine, tricyclohexenyl stibine and tri(2-ethylhexyl)stibine. Particularly preferred stibines include the trialkyl, tricycloalkyl, tri(alkylcycloalkyl), triaryl and trialkaryl stibines and particularly those wherein each alkyl, cycloalkyl, alkylcycloalkyl and aryl and alkaryl radicals contain no more than 12 carbon atoms and preferably not more than 9 carbon atoms.

The organo-substituted bismuthines are those of the formula Bi(R)₃ wherein at least one R is an organic radical and the other R's may be hydrogen or organic radicals. Preferred bismuthines include the trihydrocarbyl bismuthines and the dihydrocarbyl bismuthines, such as, for example, trixylyl bismuthine, triphenyl bismuthine, tributyl bismuthine, tricyclohexyl bismuthine tridecyl bismuthine and diphenyl octyl bismuthine. Particularly preferred bismuthines include the trialkyl, tricycloalkyl, tri(alkcycloalkyl), triaryl and trialkaryl bismuthines and particularly those wherein each alkyl, cycloalkyl, alkcycloalkyl and aryl and alkaryl radicals contain no more than 12 carbon atoms and preferably not more than 8 carbon atoms.

The reaction of the glycidyl ester or ether with the acid, alcohol, phenol, mercaptan or thiophenol may be carried out with, or preferably without, solvents such as xylene, toluene and pentane. The esterification/etherification catalyst may be used in amounts of 0.05–3 percent w., based on the glycidyl compound and the other reaction component. When a phosphine catalyst is employed, amounts of 0.1–1.0 percent w. are preferred, in particular, 0.1–0.3 percent w. The polymerization inhibitor may be present in the reaction mixture in amounts of, e.g., 0.01–2.0 percent w., based on the reaction components. The reaction mixture is kept at a temperature between room temperature and about 200° C., preferably between 100 and 140° C., until the acid value of the mixture diminishes to a value indicating substantially complete conversion of the reactants, i.e., a conversion of the glycidyl compound of, in general, at least 95%.

The hydroxy-containing ester obtained may be worked up in any known matter, e.g., by an alkaline wash after dilution with a low-boiling hydrocarbon. A treatment with activated carbon may be necessary to improve the color of the product. When a phosphine is employed as esterification catalyst, the hydroxy-containing ester may be used without working up.

According to the invention the unsaturated hydroxy-containing ester (A) is copolymerized in an aqueous dispersion with at least one other olefinically unsaturated comonomer (B) which is free of carboxyl groups. Examples of suitable comonomers are ethylene, propylene, styrene, alpha - substituted styrene such as alpha-methyl styrene, halogen-substituted styrene such as chloro-styrene, vinyl toluene, vinylidene chloride, butadiene, isoprene, dibutyl maleate, dibutyl fumarate, vinyl acetate, methyl methacrylate, and butyl acrylate. A preferred comonomer is vinyl chloride. Of course, two or more comonomers of type (B) may be copolymerized with the hydroxy-containing ester (A).

The properties of the copolymer can be balanced by varying the number and type of monomers used. The physical nature of the final copolymers can also be varied by manipulating reaction conditions and catalysts. It is preferred to have the hydroxy-containing ester (A) and the comonomer(s) (B) present in the copolymerization mixture in weight ratios between 10:90 and 50:50, in particular between 20:80 and 40:60. When vinyl chloride is employed as comonomer, a weight ratio between vinyl chloride and hydroxy-containing ester of 65/35 may result in a fine balance of properties in the copolymer.

The copolymerization is carried out in an aqueous dispersion, e.g., in a suspension, but preferably in an emulsion. Since this type of polymerization, and the working-up of the resulting polymer dispersions, are well-known in the art, it will suffice to refer in this respect to handbooks such as the "Encyclopedia of Polymer Science and Technology" by H. F. Mark et al., 1966, vol. 5, pages 801–859, and to the examples given hereinafter. The copolymerization temperature will, in general, be between 40 and 100° C., in particular, between 60 and 90° C. In connection with their ease of application it is desirable that the copolymers obtained have a K-value between 25 and 55, in particular, between 30 and 40. An increase of the reaction temperature and/or the use of a chain transfer agent such as tetrahydrofuran will result in a decrease of the K-value. It is desirable to control the pH of the latex, e.g., by addition of borax or potassium carbonate, in such a way that the pH of the latex is in the range between 4 and 7, preferably between 6 and 7.

Suitable dispersing, emulsifying or suspension agents include the anionic, cationic and nonionic surfactants.

Suitable surface-active agents that contain one anionic group per molecule are, for instance, alkylaryl sulfonates, such as alkylbenzene sulfonates. Such alkylbenzene sulfonates can be prepared by such known processes as alkylation of benzene with, for instance, propene tetramer, straight-chain olefins, or chlorinated kerosine, followed by sulfonation and neutralization of the resultant sulfonic acid; if so desired, disulfonic acid and sulfuric acid salts may be removed. Other suitable anionic surface-active agents are, for instance, salts of sulfosuccinic esters, such as dihexyl ester, dioctyl ester and ditridecyl ester. Other anionic surface-active agents are, for instance, alkyl sulfonates, alkyl sulfates, sulfates of hydroxyethyl esters of monocarboxylic acids, sulfates of alkylphenoxypolyethoxyethanols, sulfates or sulfonates of hydroxypropyl esters of monocarboxylic acids and sulfates of monoglycerides of monocarboxylic acids. Compounds in this category that contain 12 to 24 carbon atoms per molecule are preferred. Salts of monocarboxylic acids, such as palmitic acid, stearic acid or monocarboxylic acids branched at the alpha position and containing 9 to 19 carbon atoms per molecule may also be considered. Furthermore, if so desired, mixture of the aforesaid anionic surface-active agents can be applied.

Suitable nonionic surface-active agents are, for instance, reaction products of hydroxy compounds with one or more alkylene oxides, such as ethylene oxide and propylene oxide. Very suitable are reaction products of phenols with alkylene oxides, such as reaction products of the general formula

in which R stands for an alkyl group with 6 to 16 carbon atoms and $n$ is a number between 6 and 40. Compounds in which R represents an octyl or a nonyl group are preferred. Such compounds can be prepared by known means by alkylation of phenol with olefins, such as diisobutene or propene trimer, followed by reaction with ethylene oxide. This generally yields mixtures of reaction products, which mixtures may be effectively characterized by the average length of the ethene-oxy chain.

Other suitable nonionic surface-active agents are reaction products of ethylene oxide with polypropylene glycol ethers. Compounds obtained by reaction of 60–90 parts by weight of ethylene oxide per 100 parts by weight of product, are preferred.

Other suitable nonionic surface-active agents are reaction products of ethylene oxide with monocarboxylic acids, such as lauric acid, palmitic acid, stearic acid or mixtures of fatty acids; furthermore, reaction products of ethylene oxide with alcohols, such as octyl alcohol, lauryl alcohol or cetyl alcohol.

It has been found that the properties of the resulting copolymers may be improved by washing it with an organic diluent. Suitable diluents are, e.g., methanol, ethanol and ether. The washing treatment may be carried out at room temperature with about 0.1–5 liters of diluent per 100 grams of copolymer.

The copolymers obtainable according to the invention are useful in thermosetting coating compositions which are specially suited for finishing appliances, such as refrigerators, washing machines and stoves. These finishes have excellent alkali and detergent resistance, resistance to food and drug stains and chemical fumes, and also show a superior whiteness retention, in addition to excellent mechanical properties. Films prepared from these compositions possess a polishability which equals that of the much higher priced thermosetting acrylics. This quality is of importance in such applications as respraying car bodies.

Coating compositions can be prepared by blending the copolymers with solvents (hydrocarbons, alcohols, ketones, esters, ethers), pigments and such modifying agents as plasticizers and fillers in a ball mill or other suitable apparatus. A curing resin is incorporated, e.g., an aldehyde condensate or a diisocyanate. Suitable aldehyde condensates are the phenol formaldehyde resins and aminoplast resins such as urea formaldehyde and melamine formaldehyde condensate. Very useful curing resins are the melamine-formaldehyde condensates, in which part of or all of the methylol groups have been etherified with lower alcohols such as methanol. The copolymer and the curing resin may be used in weight ratios between 95/5 and 50/50, preferably between 70/30 and 85/15.

The following examples are presented in order to illustrate the compositions of the instant invention. The reactants, and their proportions, and other specific ingredients of the formulations are presented as being typical and various modifications may be made in view of the foregoing disclosure without departing from the spirit or scope of the disclosure or of the claims. Unless otherwise specified, parts and percentages are given by weight.

"Cardura" E used in the examples is a commercial mixed glycidyl ester, obtained by reaction of epichlorohydrin with a mixture of saturated, monobasic carboxylic acids, mainly of a tertiary nature and having a chain length of 9 to 11 carbon atoms; up to about 6% of the acids may be of a secondary nature. The acrylic and methacrylic acids used in the examples were stabilized with 200 p.p.m. (based on acid) of hydroquinone monomethyl ether.

EXAMPLE I (A) Acrylic acid and "Cardura" E were reacted at 105° C. in a molar ratio of 1:1/1 in the presence of a trace of KOH (about 0.055 percent m. based on acrylic acid) and of 0.15 percent w. (based on "Cardura" E) of hydroquinone. Acrylic acid was gradually added over a period of 2 hours. After the addition of the acid more inhibitor (0.04 percent w.) and catalyst (0.019 percent m.) was added. An almost complete conversion was reached after a total reaction period of 5 hours. After cooling, the reaction mixture was diluted with pentane (150 ml./100 g. of reaction product), extracted with a 0.5 percent w. aqueous NaOH solution, and washed with water. The brownish pentane solution was treated at room temperature with activated carbon and filtered. Finally, the pentane was removed under vacuum. The hydroxy-containing acrylic acid ester was isolated in a yield of 96%. The major part of it is believed to have the following formula:

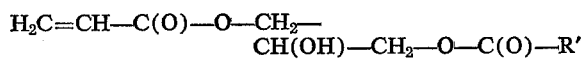

$H_2C=CH-C(O)-O-CH_2-$
$\quad\quad\quad\quad CH(OH)-CH_2-O-C(O)-R'$ in which R' is a tertiary alkyl radical of 8 to 10 carbon atoms, present in the "Cardura" E. The hydroxyl content of the product was 317 meq./100 g. (theoretically 311 meq./100 g.). This type of acrylic acid ester will be referred to as ACE adduct.

(B) Copolymers of the above ACE adduct with vinyl chloride (VC) were prepared via a potassium persulfate initiated copolymerization in emulsion. The aqueous phase contained 210 g. of water, 0.5 g. of Fenopon SF 78 (the sodium salt of dodecylbenzenesulphonate), 1 g. of borax, 1.5 g. of $K_2S_2O_8$, 65 g. of vinyl chloride and 35 g. of the ACE adduct. The monomer emulsion and $K_2S_2O_8$ solution were separately introduced, over a period of 4 hours, into a stainless steel autoclave which was kept at the reaction temperature; after the introduction of the monomers and the initiator the reaction mixure was kept at the reaction temperature for an additional hour. The total reaction period thus was 5 hours. Working-up of the polymer was by coagulation with $CaCl_2$ or, alternatively, with $HNO_3$ or by freezing, followed by washing and drying. The results are tabulated in Table I.

TABLE I

| Polymer | Reaction temperature, ° C. | Yield of polymer, g. | Polymer properties | | |
|---|---|---|---|---|---|
| | | | Acid value, meq./100 g. | Hydroxyl content, meq./100 g. | K-value |
| Ib1 | 80 | 80 | 9.0 | 115 | 46.2 |
| Ib2[1] | 70 | 80 | 2.0 | 102 | 39.7 |
| Ib3[1] | 80 | 80 | 7.7 | 108 | 32.0 |

[1] These copolymers were prepared in the presence of 3 g. of tetrahydrofuran, acting as a chain transfer agent.

(C) For comparative purposes a similar polymer was prepared by reacting a vinyl chloride/acrylic acid copolymer with "Cardura" E.

At a temperature of 80° C. vinyl chloride and acrylic acid were copolymerized for 5 hours in molar ratios of 97.75/2.25, 90/10 and 94.5/5.5. The reaction mixture contained 255 ml. of ethyl acetate per 100 g. of monomer as a diluent, and 1 percent w. (on monomers) of dibenzoyl peroxide as initiator. The resulting copolymers were subsequently reacted with "Cardura" E in methyl isobutyl ketone (800 ml. per 250 g. of copolymer) for 4.5 hours at 104° C., for 16.5 hours at 60° C., and for another 2.5 hours at 104° C. in the presence of 0.2 percent m. of KOH (based on carboxyl groups present in the copolymer). Further details of these experiments are noted in Table II.

TABLE II

| Copolymer | Ic1a | Ic2a | Ic3a |
|---|---|---|---|
| VC/acrylic acid ratio | 97.75/2.25 | 90/10 | 94.5/5.5 |
| Acid value, meq./100 g. | 141 | 229 | 135 |
| K-value | 40 | 32 | 30 |

| Reaction product with "Cardura" E: | Ic1b | Ic2b | Ic3b |
|---|---|---|---|
| Moles of "Cardura" E per equivalent —COOH | 1.2/1 | 1.07/1 | 1.07/1 |
| Conversion (percent) of carboxyl groups after: | | | |
| 4.5 hours | | 79 | 65 |
| 21 hours | | 81 | 71 |
| 23.5 hours | 73 | 83 | 73 |
| Acid value, meq./100 g. | | 30.3 | 32.3 |

It is apparent, that even after a prolonged reaction time, the reaction products of "Cardura" E with VC/acrylic acid copolymers still contain considerable amounts of free carboxyl groups, notwithstanding the fact that an excess of glycidyl compound was used. Upon curing of these copolymers with formaldehyde condensates, free carboxyl groups have a detrimental influence on the color stability and other properties of the resin, as will be shown in the following Example I (D).

(D) Copolymers Ib2 and Ib3 (according to the invention) and Ic2b and Ic3b (for comparative purposes) were cured with "Cymel" 301, which is a hexamethoxymethyl-melamine in a composition pigmented with $TiO_2$ rutile. The weight ratio of copolymer/Cymel was 80/20. Films were prepared from these compositions and cured at 120° C. for 20 minutes. The results are tabulated in Table III.

TABLE III

| Copolymer | Ib2 | Ib3 | Ic2b | Ic3b |
|---|---|---|---|---|
| Acid value, meq./100 g. | 2.0 | 7.7 | 30.3 | 32.3 |
| Pigment/binder ratio | 0.6 | 0.6 | 0.6 | 0.6 |
| Whiteness after curing (100=white) | 88.6 | 85.2 | 80.6 | 75.3 |
| Akali resistance[1] (5% NaOH at room temperature after 14 days) | 7-8 | 7-8 | 5-6 | 7-8 |
| "OMO"—resistance[1,2] (0.5% solution at 70° C. after 2 hours) | 10 | 9-10 | 8 | 8-9 |

[1] Alkali- and OMO-resistance evaluation are given, using a 1 to 10 scale; 10=no attack, 1=film completely destroyed.
[2] "OMO" is a registered trademark for an alkyl aryl sulfonate based commercial synthetic detergent.

It will be noted from the above data that copolymers prepared according to the invention not only possess a better whiteness retention but also a butter resistance to alkaline agents.

EXAMPLE II (A) VC and ACE were copolymerized, substantially as described in Example I(B). Various amounts of tetrahydrofuran were employed. Further details of the experiments are given in Table IV.

TABLE IV

| Copolymer | VC/ACE, percent w. | Reaction temp., °C. | Tetra-hydro-furan [1] | K-value | Acid value, meq./100 g. pol. | OH-content, meq./100 g. pol. |
|---|---|---|---|---|---|---|
| IIa1 | 65/35 | 70 | 6 | 29 | 1.6 | 113 |
| IIa2 | 75/25 | 80 | 3 | 38.5 | 0.3 | 71 |
| IIa3 | 65/35 | 80 | 3 | 31.5 | 1.1 | 97 |
| IIa4 | 55/45 | 70 | 5 | 33.5 | 0.3 | 127 |
| IIa5 | 45/55 | 70 | 5 | 36 | 0.2 | 169 |
| IIa6 | 75/25 | 70 | 5 | 34.8 | 1.3 | 69 |
| IIa7 | 65/35 | 70 | 5 | 36 | 2.0 | 109 |
| IIa8 | 75/25 | 75 | 8 | 25.5 | 0.7 | 77 |
| IIa9 | 92/8 | 65 | | 49.2 | 1.0 | 20 |
| IIa10 | [2] 92/8 | 51 | | 45 | 2.0 | 22 |

[1] Grams per 100 g. of monomers.
[2] A redox initiator was used consisting of a trace of iron and 1 percent w. of $K_2S_2O_8$ and 0.3 percent w. of $NaHSO_3$, based on monomers.

The copolymers obtained possessed an excellent compatibility with curing resins such as condensates of urea formaldehyde, phenol formaldehyde and melamine formaldehyde.

(B) A number of the above copolymers were formulated to paint compositions by admixing 25 percent w., based on copolymer, of Maprenal NP (a registered trademark for a melamine formaldehyde condensate), $TiO_2$, rutile, so as to obtain a pigment/binder ratio of 0.6 and 0.5 percent w. of p-toluenesulfonic acid, based on binder. The compositions were diluted with methylisobutyl ketone to a suitable spraying viscosity. Films sprayed upon sandblasted steel panels were cured for 40 minutes at 120° C. The results are tabulated in Table V.

TABLE V

| Copolymer used | IIa1 | IIa2 | IIa3 | IIa4 | IIa5 | IIa6 | IIa7 | IIa8 |
|---|---|---|---|---|---|---|---|---|
| Spraying viscosity of composition, cp | 20 | 24 | 20 | 20 | 21 | 16 | 21 | 22 |
| Solids content, percent w | 27.6 | 17.1 | 26.8 | 29.1 | 28.2 | 19.5 | 22.2 | 25.5 |
| Gloss of film after curing | 100 | 61 | 98 | 100 | 97 | 100 | 91 | 93 |
| Whiteness of film after— | | | | | | | | |
| Curing | 85 | 82 | 80 | 88 | 84 | 84 | 87 | 86 |
| 1,000 hrs. exposure to U.V. light | 82 | 78 | 86 | 82 | 75 | 89 | 84 | 71 |
| Buchholz hardness | 105 | 111 | 105 | 100 | 105 | 111 | 111 | 114 |
| Erichsen impact | 1.5 | 1.9 | 1.9 | 1.5 | 1.0 | 0.8 | 1.1 | 0.4 |
| Erichsen penetration, mm | 5.0 | 5.6 | 5.3 | 5.1 | 4.7 | 6.2 | 6.1 | 5.8 |
| Alkali resistance (5% NaOH, room temp., 7 days) | 8-9 | 9 | 8-9 | 8-9 | 7 | 9 | 8 | 1 |
| "OMO" resistance (0.5%, 70° C., 2 hrs.) | 9 | 10 | 9 | 9-10 | 7 | 10 | 9 | 0 |
| Humidity cabinet resistance, 2 weeks' exposure | 8 | 9 | 7-8 | 7-8 | | 8 | 7-8 | 9-19 |

EXAMPLE III (A) "Cardura" E (3.03 mole) was heated to 105° C., whereupon 1 g. of hydroquinone and 3 ml. of an 0.5 N methanolic KOH solution were added. The 3.3 mole of acrylic acid stabilized with 200 p.p.m. of hydroquinone monomethyl ether were introduced into the reactor over a period of 3 hours. Subsequently 0.25 g. of hydroquinone and 1 ml. of the methanolic KOH solution were added to the reaction mixture, which was kept at 105° C. for 2 additional hours. After cooling, the mixture was diluted with 1.5 l. of pentane, extracted with a sodium hydroxide solution (0.5%), and washed with water. The solution of ACE in pentane was treated at room temperature with decolorizing carbon, and filtered. Finally, the pentane was sucked off under vacuum. A conversion of the acrylic acid of more than 99% was obtained (viscosity of the product 85.5 cs.).

(B) Similarly, when under conditions identical to those described in Example III(A), 6 mole of "Cardura" E was reacted with 6.6 mole of methacrylic acid in the presence of hydroquinone and KOH (5 ml. of the methanolic solution) at 107° C. for 10 hours, a 99% conversion of the acid to a "Cardura" E/methacrylic acid (MACE) adduct was obtained.

EXAMPLE IV (A) This example illustrates the benficial influence of a phosphine catalyst in the preparation of adducts from glycidyl esters and unsaturated acids. The main advantages are: shorter reaction time; no need for an excess of acid or for adding a polymerization inhibitor such as hydroquinone. The product may be used as such, so that a decolorizing treatment, e.g., with active carbon, is not necessary. Neither the unreacted acid, nor the small amount of inhibitor usually present in the unsaturated acid are detrimental in the subsequent polymerization in aqueous dispersion.

In the preparation of the adduct equivalent amounts of "Cardura" E and acrylic acid or methacrylic acid mixed with the triphenyl phosphine catalyst, were rapidly heated to the reaction temperature. No additional working-up applied. Further experimental conditions and results are given in Table VI.

TABLE VI

| | | | Reaction | | Product properties | | |
|---|---|---|---|---|---|---|---|
| Adduct | Acid used | Amount of catalyst, percent w.[1] | Temperature, °C. | Time, hrs. | Conversion of— | | Viscosity, cs. |
| | | | | | Epoxy, percent | Acid, percent | |
| IVa1 | Acrylic | 1 | 115 | 2 | 93 | 98 | 86.2 |
| IVa2 | do | 1 | 120 | 2 | 95.3 | 99 | 92.1 |
| IVa3 | do | 1 | 130 | 1.75 | 96.6 | >99 | 124.3 |
| IVa4 | do | 1 | 140 | 1.75 | 97.2 | >99 | 227.3 |
| IVa5 | do [2] | 1 | 120 | 2 | 95.2 | >99 | 93 |
| IVa6 | do [3] | 1 | 140 | 1.75 | 98.4 | >99 | 352.7 |
| IVa7 | do | 0.5 | 120 | 2 | 94.1 | 97.3 | 82.7 |
| IVa8 | do | 0.25 | 125 | 2 | 94.6 | 96.9 | 80.6 |
| IVa9 | do | 0.20 | 135 | 2 | 96.4 | 98.3 | 85 |
| IVa10 | do | 0.10 | 138 | 1.75 | 96.0 | 97.5 | >350 |
| IVa11 | Methacrylic | 1 | 115 | 2 | 96.2 | 96.3 | 84.6 |
| IVa12 | do | 1 | 120 | 2 | 97.2 | 95.8 | 101.8 |
| IVa13 | Acrylic | 0.15 | 138 | 2 | 96.5 | 98.1 | 84.2 |

[1] Based on "CARDURA" E.
[2] An additional 200 p.p.m. of hydroquinone monomethylether (based on acrylic acid) was added.
[3] Ibid. 100 p.p.m.

The above adducts possessed an olefinic unsaturation of between 244 and 304 meq./100 g., a hydroxyl content of between 300 and 324 meq.100 g. and a Gardner color of between 1.5 and 4.0, i.e., light yellow to yellow. It may be noted from the above table that the conversion of the acid is quantitative or nearly quantitative. The higher the reaction temperatures, the higher the viscosities will be. It is remarkable that very small amounts of catalyst in combination with higher temperatures tend to produce adducts having excessive viscosities (cf. Examples 9 and 10). From a comparison of Examples V and VI with Examples II and IV it follows that the use of additional amounts of the hydroquinone polymerization inhibitor is hardly beneficial, if at all. The most suitable reaction conditions appear to be: about 0.15 percent w. of triphenyl phosphine (based on "Cardura" E), a reaction temperature of around 135° C., a reaction time of about 2 hours, and equivalent ratios of "Cardura" E and acrylic acid. No further working-up is required (pentane dilution, carbonate wash, activated carbon treatment); the product may be used as such for copolymerization with the olefinically unsaturated monomer.

When KOH is used as a catalyst, a longer reaction time is required as well as an additional amount of inhibitor, which has to be removed by an alkaline wash. In the absence of additional inhibitor an adduct of very high viscosity usually results.

(B) Some of the adducts prepared with triphenyl phosphine as catalyst were copolymerized with VC in a 35/65 ratio, substantially following the method of Example I(B). The adducts were used as crude product, i.e., they were not subjected to a working-up procedure. Results of the copolymerization are given in Table VII.

TABLE VII

| Resulting copolymer | ACE adduct used | THF used, percent w.[1] | Product properties | | |
|---|---|---|---|---|---|
| | | | Acid value meq./100 g. | Hydroxyl content, meq./100 g. | K-value |
| IVb1 | IVa2 | 5 | 7.8 | 110 | 34.5 |
| IVb2 | IVa7 | 6 | 6.0 | 100 | 30 |
| IVb3 | IVa8 | 6 | 6.2 | 104 | 37.5 |
| IVb4 | IVa13 | 8 | 5.0 | 111 | 34 |
| IVb5 | IVa13 | 6 | 5.7 | 110 | 35.5 |

[1] On monomers.

(C) Copolymer IVb5 was washed at room temperarture with 1 liter of methanol per 300 grams of copolymer, resulting in a product IVb5a. The copolymers IVb3, IVb4 and IVb5a were mixed with "Maprenal" NP (a urea formaldehyde curing resin) in a weight ratio of 80/20, with titania in a pigment/binder ratio of 0.6, and with 0.5 percent w. based on the copolymer of the ammonium salt of para-toluene sulfonic acid. From these compositions 30%

TABLE VIII

| Copolymer material | IVb3 | IVb4 | IVb5 | IVb5a |
|---|---|---|---|---|
| Viscosity of the 30% solution, cs | 211 | 140 | 158 | 260 |
| Film properties after curing: | | | | |
| Whiteness | 80 | 78 | 73 | 74 |
| Gloss | 82 | 82 | 91 | 92 |
| Buchholz hardness | 100 | 95 | 100 | 100 |
| Impact strength, inch-lbs | 4 | 8 | 7 | 16 |
| Erichsen penetration, mm | 5.8 | 6.3 | 5.8 | 6.2 |
| Alkali resistance (5% NaOH at room temperature after 7 days) | 9 | 8 | 9–10 | 9 |
| "OMO"-resistance (0.5% solution at 70° C. after 2 hours) | 9 | 10 | 9–10 | 10 | solutions in methyl isobutyl ketone were prepared. Films produced from the solutions were cured for 40 minutes at 120° C. Results are given in Table VIII.

EXAMPLE V (A) The ACE adduct of Example I(A) and the MACE adduct of Example III(B) were used in copolymerizations with styrene and VC, substantially following the method described in Example I(B). Details may be derived from Table IX.

TABLE IX

| Copolymer | Monomers, w./w. | Reaction conditions | | | Product properties | | |
|---|---|---|---|---|---|---|---|
| | | Temp., °C. | Time, hrs. | THF[1] | K-value | Acid value, meq./100 g. | Hydroxyl meq./100 g. |
| Va1 | VC/MACE 65/35 | 70 | 5 | 5 | 30 | 1.6 | 102 |
| Va2 | VC/MACE 75/25 | 70 | 5 | 5 | 33.5 | 1.5 | 70 |
| Va3 | Styrene/ACE 65/35 | 80 | 5 | | (²) | 0 | 119 |

[1] Tetrahydrofuran, parts per 100 parts by weight of monomer.
[2] Not determined.

(B) For comparative purposes VC and the MACE adduct of Example III(B) were copolymerized in a weight ratio of 75/25 in an autoclave at 70° C. in the presence of, as solvent, 200 ml. of ethyl acetate/100 g. of monomer, and 1 percent w. (based on monomer) of benzoylperoxide as initiator. The monomer and initiator solutions were separately and gradually added to the autoclave over a period of 4 hours, after which the autoclave was kept at the reaction temperature for an additional hour. It appeared that only 17.5% of the monomers had been converted to a copolymer having a hydroxyl content of 220 meq./100 g. and a K-value of 22. This result indicates that copolymerization in an aqueous medium is to be preferred.

We claim as our invention:

1. Hydroxyl-containing copolymers having a low carboxyl content prepared by polymerizing in aqueous dispersion
   (1) from 10 to 50 parts by weight of an olefinically unsaturated hydroxyl-containing ester of the general formula

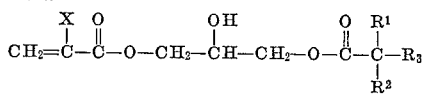

wherein X is hydrogen or methyl, $R_1$ and $R_2$ are each alkyl radicals, $R_3$ is hydrogen or an alkyl radical and $R_1$, $R_2$ and $R_3$ contain the sum total of 2 to about 20 carbon atoms, and
   (2) from 50 to 90 parts by weight of at least one other olefinically unsaturated comonomer which is substantially free of carboxyl groups.

2. A copolymer as in claim 1 wherein the polymerization is performed in the presence of a catalyst.

3. A copolymer as in claim 2 wherein the catalyst is a peroxide.

4. A copolymer as in claim 3 wherein the catalyst is a persulfate.

5. A copolymer as in claim 1 wherein the olefinically unsaturated monomer is vinyl chloride.

6. A copolymer as in claim 5 wherein the weight ratio of (1) to (2) is 35:65.

7. A copolymer as in claim 1 wherein $R^1$, $R^2$ and $R^3$ contain a sum total of 7 to 9 carbon atoms.

References Cited

UNITED STATES PATENTS 3,167,583   1/1965   Goldberg et al.   260—86.1
3,178,380   4/1965   Porret            260—86.1

HARRY WONG, Jr., Primary Examiner

U.S. Cl. X.R.

260—31.2, 32.8, 33.2, 33.4, 33.6, 41.47, 78.5, 79.7, 80.3, 80.81, 83.5, 86.1, 86.7, 87.5, 844, 845, 847, 848, 851, 852, 853, 854, 855, 856